United States Patent [19]

Chou

[11] Patent Number: 4,913,172

[45] Date of Patent: Apr. 3, 1990

[54] COMB STRUCTURE WITH OINTMENT

[76] Inventor: Fargo Chou, 306 Chung Cheng Rd., Yung-Ho City 23433, Taipei, Taiwan

[21] Appl. No.: 286,350

[22] Filed: Dec. 19, 1988

[51] Int. Cl.[4] .................. A45D 24/24; A45D 24/10
[52] U.S. Cl. ........................ 132/118; 119/156; 132/113; 132/271
[58] Field of Search ............... 132/112, 114, 115, 118, 132/150, 151, 111, 109; 119/156, 83

[56] References Cited

U.S. PATENT DOCUMENTS

| | | | |
|---|---|---|---|
| 573,437 | 12/1896 | Bowdoin | 132/118 |
| 736,266 | 8/1903 | Johnson | 132/118 |
| 1,425,269 | 8/1922 | Miller | 132/111 |
| 1,426,111 | 8/1922 | Sacker | 132/150 |
| 1,516,992 | 11/1924 | Silverman | 132/150 |
| 1,566,886 | 12/1925 | Lillie | 132/114 |
| 1,661,287 | 3/1928 | Henige | 132/114 |
| 1,693,248 | 11/1928 | Newton | 132/114 |
| 1,698,631 | 1/1929 | Hutchings | 132/109 |
| 1,903,646 | 4/1933 | Jameson | 132/114 |
| 2,009,773 | 7/1935 | Heflin | 128/65 |
| 2,170,550 | 8/1939 | Corel | 132/114 |
| 2,624,345 | 1/1953 | Matson | 132/114 |
| 3,916,918 | 11/1976 | Spinks | 132/150 |
| 4,044,724 | 8/1977 | Merchill | 132/112 |
| 4,257,434 | 3/1981 | Wahl | 132/118 |
| 4,605,026 | 8/1986 | Nolin | 132/112 |

Primary Examiner—Paul J. Hirsch
Attorney, Agent, or Firm—Esso Int'l Patent and Trademark Office

[57] ABSTRACT

A comb structure that includes a handle, and a hollow housing having a number of hollow teeth extending away from the handle. Communicating cavities in the handle and housing provide storage for a liquid ointment that can infiltrate out through holes at tip areas of the teeth. The comb structure can be drawn through fur on a live animal (pet) or fur on a leather pelt, such that the ointment is directed onto the skin surface of the animal or leather pelt, so as to prevent skin diseases or provide lubrication against fur loss or leather cracking. In one form of the invention the handle is adjustably connected to the tooth housing so that the structure can be used either in rake-like fashion or in comb-like fashion.

3 Claims, 7 Drawing Sheets

FIG·6

COMB STRUCTURE WITH OINTMENT

BACKGROUND OF THE INVENTION

Generally, the furs on leather are susceptible to falling out if they are not properly coated with a grease or ointment. Also, the skin of a piece of fur is subject to cracking if it is not coated with grease periodically. Moreover, the skin of a family pet animal should be washed and cleaned often, and an insecticide should be applied to the base of the animal's fur and skin to prevent skin disease. Thus far, there is no proper tool for applying ointment to the skin of a pet except using the spraying method; unfortunately, the spraying method is unable to distribute the liquid ointment deeply into the fur; as a result, parasites on the skin cannot be killed. Therefore the spraying method is deemed to have drawbacks.

SUMMARY OF THE INVENTION

In view of the aforesaid factors, the inventor has developed a comb structure for distributing ointment onto the skin of a pet animal or piece of fur. The comb structure can include a hollow handle and a series of hollow teeth for containing an ointment; the ointment can infiltrate out of the tip part of each tooth portion to flow onto the skin surface of a pet or a piece of fur, so as to cure skin disease or to obtain a proper lubrication of the skin area.

A feature of the present invention is that the hollow space within the comb structure has a heating plate therein to melt the condensed grease so as to have the grease properly infiltrated out of the cotton absorbers on tip areas of the teeth.

A further feature of the present invention is that the handle can be adjustably mounted on the top of the tooth portion by means of a screw (bolt). When the handle and the tooth portion are aligned into a straight line form, the comb structure can be used as a comb. When the handle and the tooth portion are set into a "T" form, the comb structure can be used as a rake. In other words, the handle of the present invention can be set at an angle desired to facilitate best operation thereof.

DETAILED DESCRIPTION

Figure 1:
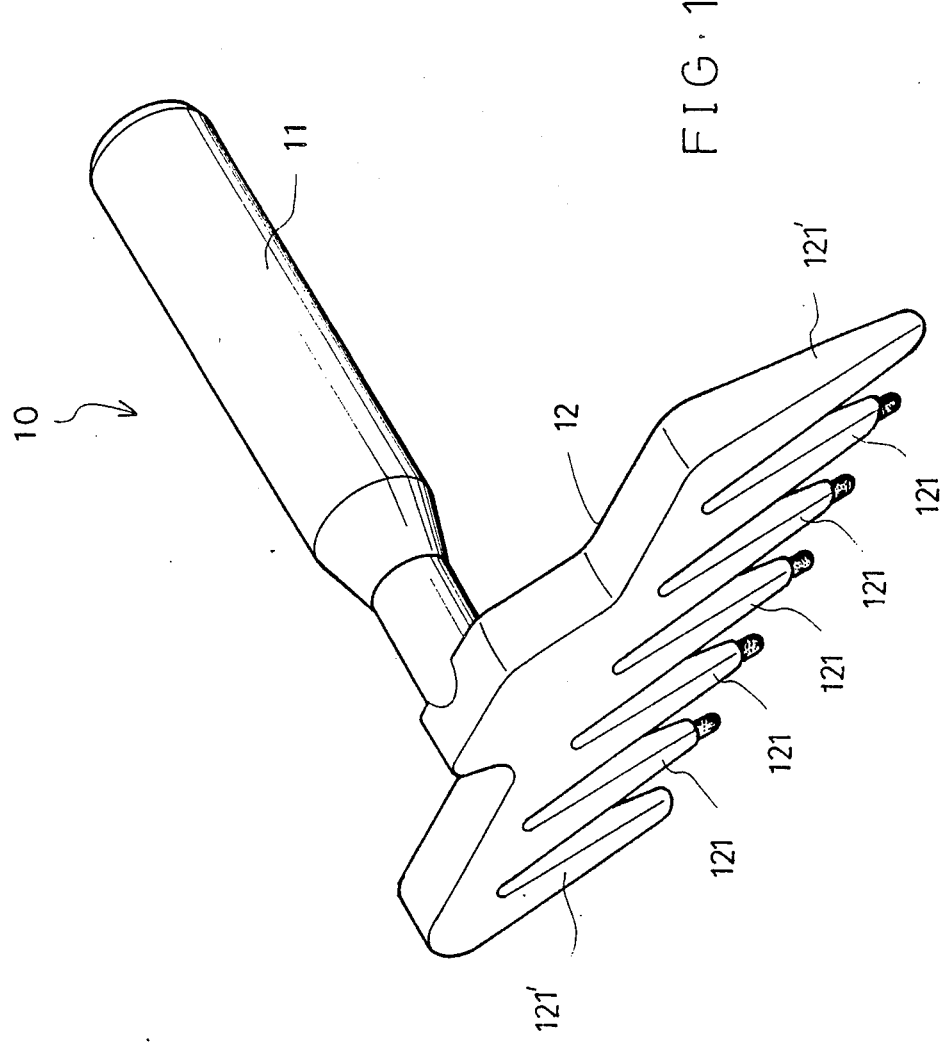
FIG. 1 is a perspective view of one embodiment according to the present invention.
Figure 7:
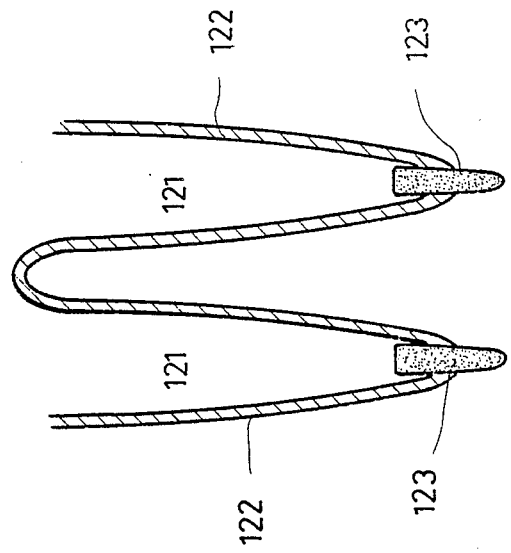
FIG. 7 is a sectional view of teeth according to the present invention.
Figure 8:
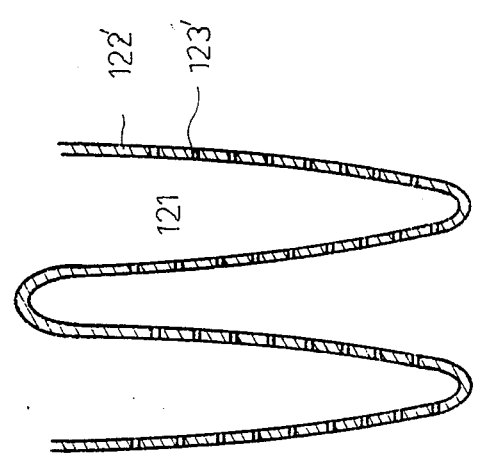
FIG. 8 is a sectional view of the teeth of another embodiment according to the present invention.

Referring to FIG. 1, there is shown a perspective view of a comb structure 10, according to the present invention. The comb structure includes a handle 11, and a hollow housing 12 configured to form hollow teeth 121. The handle 11 defines an empty cylinder (or cavity) 110 for containing ointment. The hollow housing 12 defines a cavity 120, which communicates with passages extending within teeth 121. The tip of each tooth 121 is provided with an infiltration element to let the ointment infiltrate out therefrom. A representative structure of the tooth tip area 121 is shown in FIG. 7, in which the tooth wall is a rigid plastic wall 122, into which is inserted a cotton absorber 123. The tooth 121 may have another structure as shown in FIG. 8 i.e., the wall area of the tooth tip is a rigid plastic wall 122 having a plurality of infiltrating holes $123^1$ arranged in regular order so as to facilitate the infiltration (outflow) of ointment; the infiltrating holes $123^1$ have the same infiltration effect as that of the cotton absorber 123 shown in FIG. 7. The infiltration holes $123^1$ and porous cotton absorbers 123 form liquid discharge openings in the vicinity of the tip area of each tooth 121.

Figure 2:
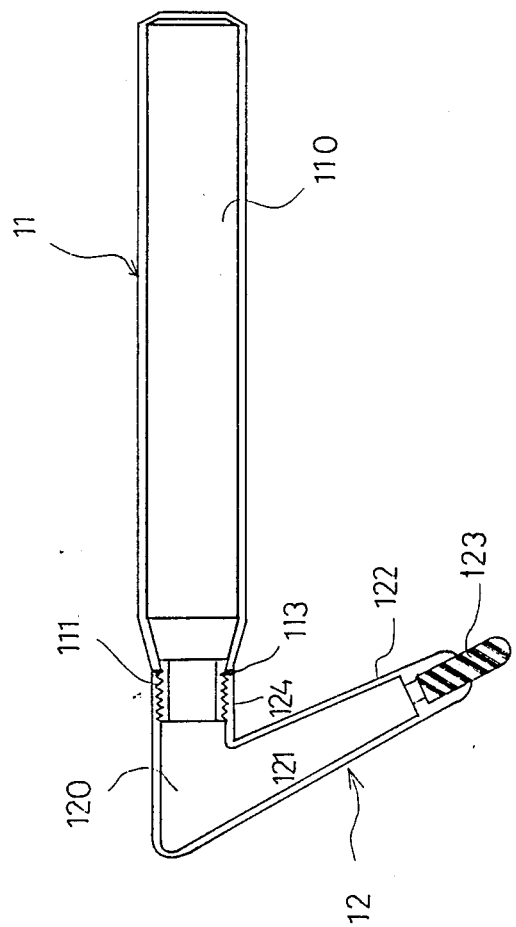
FIG. 2 is a sectional view taken through FIG. 1.

As shown in FIG. 2, the front end of handle 11 has a connecting end 111 having external threads; the tail of the teeth housing 12 has a connecting end 124 having internal threads. The two connecting ends 111 and 124 can be connected together with a ring seal 113 to prevent ointment leakage, as shown in FIG. 2. In use, a user may hold handle 11 to comb the surface of a fur or the skin surface of a pet with a suitable force so as to let the ointment in the comb infiltrate out of the infiltrating holes 123 or the cotton absorber 123. The ointment is thus applied on a fur or the skin surface of a pet in an even manner.

Figure 3:
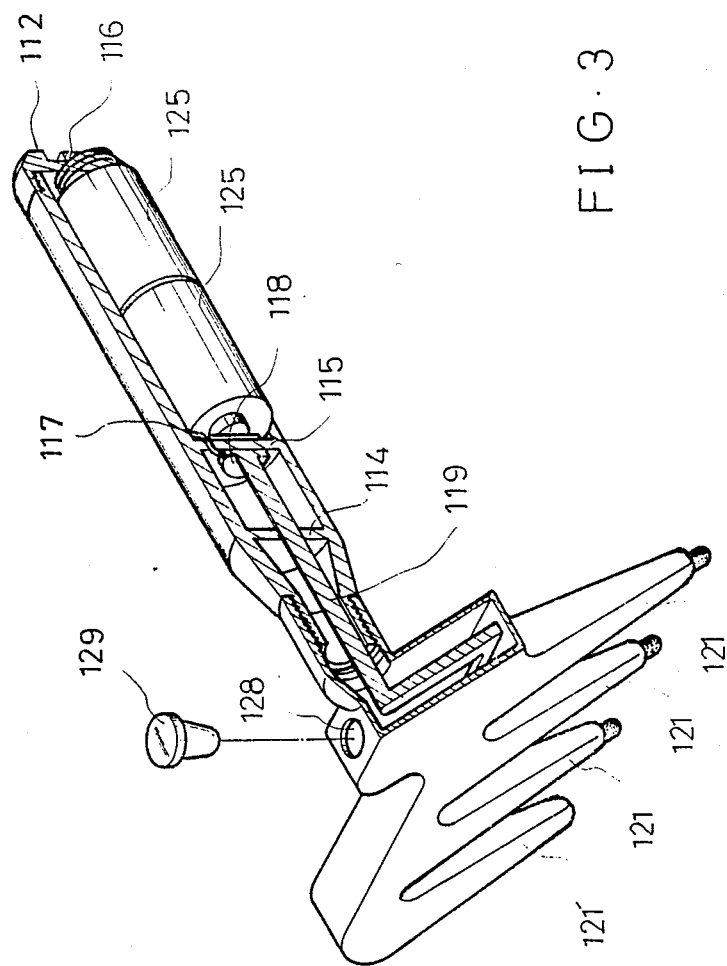
FIG. 3 is a fragmentary sectional view of another embodiment according to the present invention, in which an electric heater is installed.

FIG. 3 illustrates another embodiment of the present invention, which is to be used in winter or in frigid zones. In cold weather, the ointment (normally containing grease) is susceptible to forming into a solid, and therefore the ointment has to be heated first before infiltrating through the cotton absorber 123 or the infiltrating holes $123^1$. In this embodiment, the handle 11 and the tooth portion 12 are molded integrally into one piece. The inner space of the handle 11 is provided with two partition plates 114 and 115, an electric heater 119, and a battery chamber for loading two batteries (1.5 volts each). The tail end of the handle 11 is equipped with a battery cap 112 for holding the batteries in place and electrically connecting the batteries. The battery cap 112 is also furnished with a manual switch 116 for controlling the power source. The top of the tooth portion 12 has an ointment inlet 128 and cap plug 129 for closing the inlet 128. In use, the switch 116 is turned on so as to heat the electric heater 119 and have the ointment melted. Then, the ointment can infiltrate through the cotton absorber 123 or the infiltrating holes $123^1$.

Figure 4:
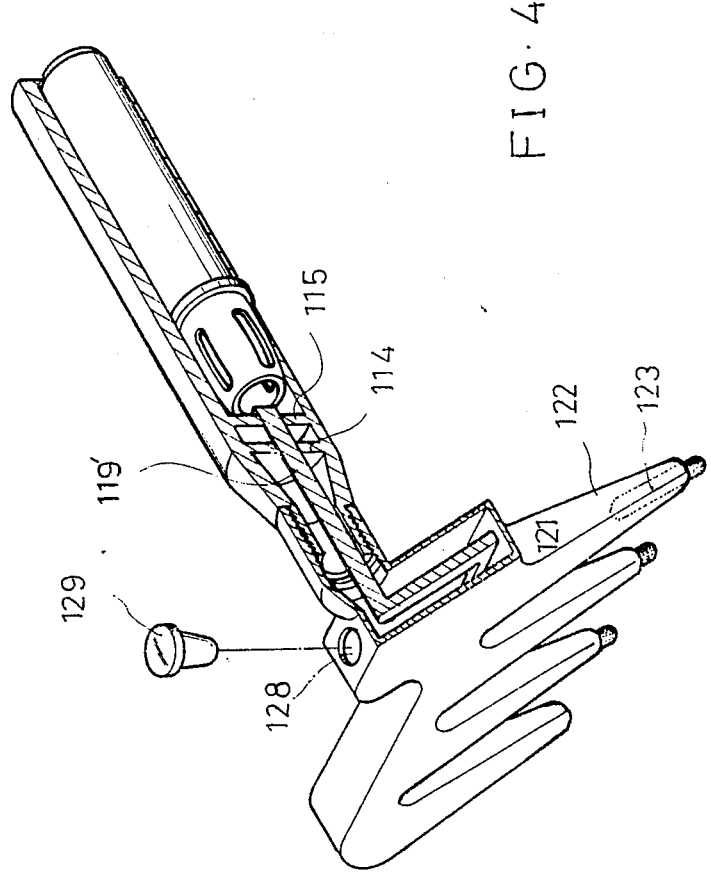
FIG. 4 is a fragmentary sectional view taken in the same direction as FIG. 3, but showing another form of the invention in which the electric heater is replaced with a gas heater.

Referring to FIG. 4, there is shown another embodiment of the present invention, in which the battery-operated heating means is replaced with a gas heating means (or alcohol) that may be ignited by the same method used to ignite a lighter (the heating method is similar to that of a platinum pocket warmer). The gas heating means heats plate 119 which melts the ointment.

Figure 5:
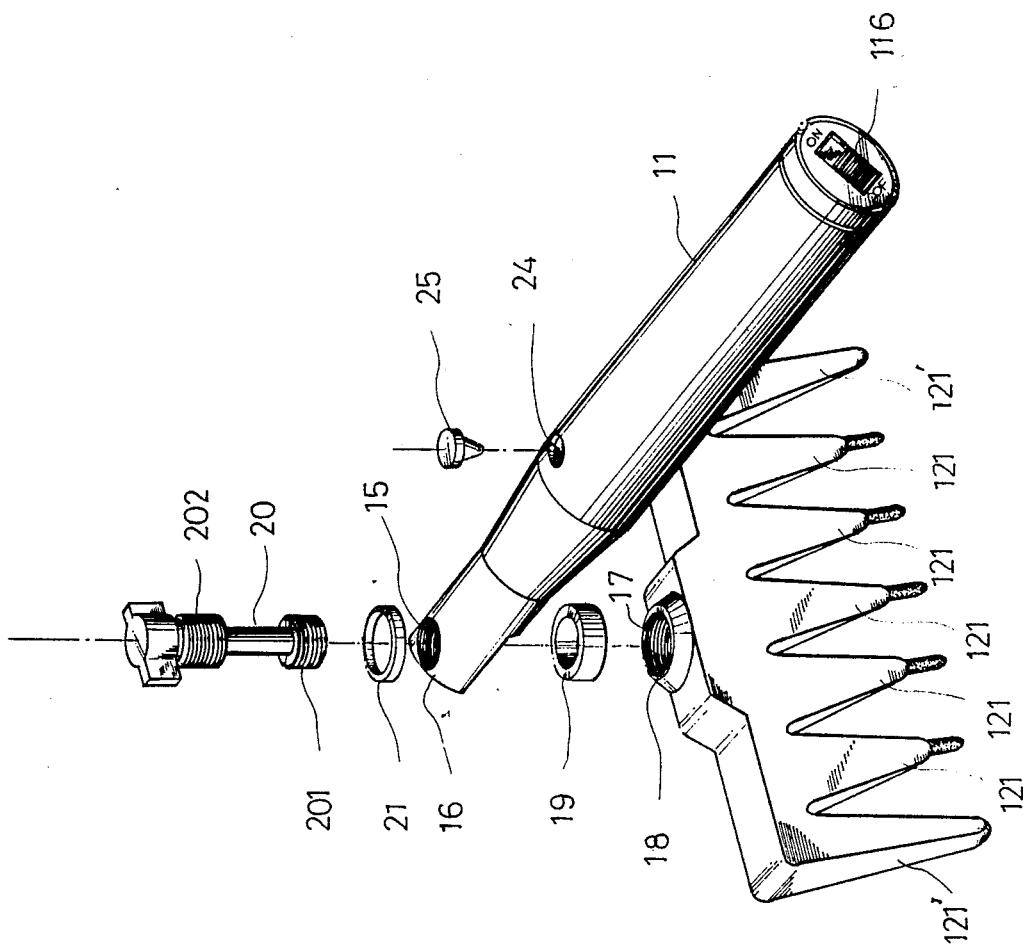
FIG. 5 is a disassembled view of another embodiment according to the present invention.

FIG. 5 illustrates a further different embodiment of the present invention, in which the front end of handle 11 is fixedly mounted on top of the hollow tooth housing by means of a screw 20. The front end of handle 11 has a screw hole 15 with inner threads 16. The bottom of the screw hole 15 has a flat portion for mounting a washer 19 therebelow. The top center portion of the tooth housing has a screw hole 17 with inner threads 18.

Figure 6:
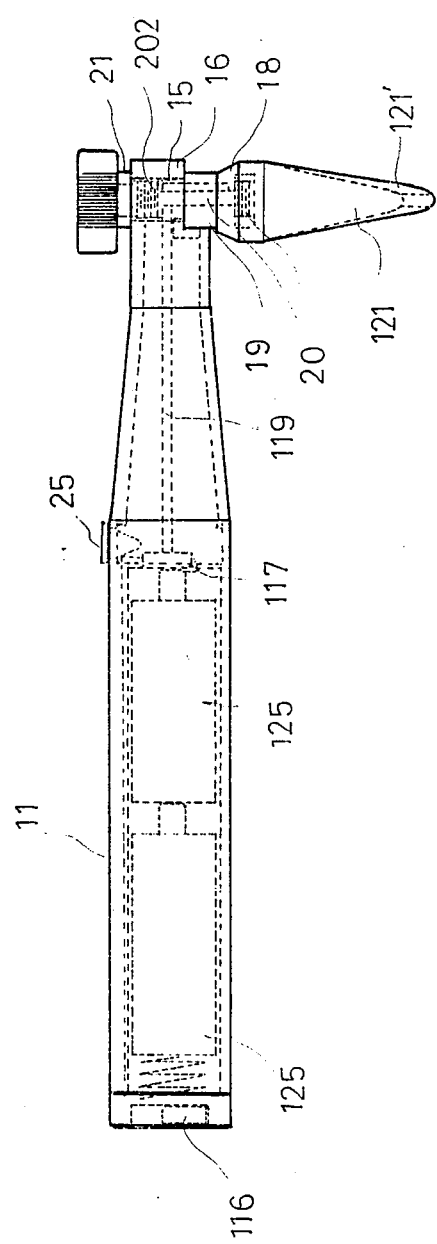
FIG. 6 is a side elevational view of the structure shown in FIG. 5.

To assemble the handle 11 and the tooth housing together, a screw (bolt) 20 is extended through a washer 21, the screw hole 14, and washer 19, so that the threads 201 on the tail portion of screw 20 are engaged with the inner threads 18 in the screw hole 17 of the tooth housing. Then, the threads 202 on the top portion of the screw 20 are engaged with the inner threads 16 on the handle 11. Since the screw 20 has a slender portion between the top and tail portions thereof, the ointment in the handle 11 can flow into the empty cavity of the hollow tooth housing along the surface of the screw 20 as shown in FIG. 6. The handle 11 may be set at a different angle in relation to the housing by rotating screw 20 to release the handle 11.

To fill the cavity within handle 11 and within the tooth housing with ointment, the cap plug 25 is removed form hole 24 on handle 11; the ointment is poured into hole 24, after which the cap plug is replaced in hole 24.

The FIG. 5 structure can be operated with teeth 121 arranged at different angles relative to handle 11. As shown in FIGS. 5 and 6, the tooth housing is arranged to extend crosswise of handle 11 in a "T" configuration; in such a configuration the structure can be used with a rake-like pulling motion to draw teeth 121 through the fur on the animal (or animal skin). By loosening screw 20 and turning the tooth housing through a ninety degree arc around the screw 20 axis, the tooth housing can be aligned with handle 11 into a straight line "comb" configuration. In such a configuration the structure can be drawn through the animal fur with a comb-like motion.

I claim:

1. A comb structure for use on fur-bearing animals or fur-bearing animal skins, comprising a hollow tooth housing having a plural number of hollow teeth extending therefrom in a common tooth plane, and a handle-attachment surface facing away from the hollow teeth; each tooth having at least one liquid discharge opening therein the vicinity of the tip area of the tooth;

an elongated rigid hollow handle adjustably attached to the hollow housing for manual movement of the teeth through animal fur;

said handle having one end thereof overlying the attachment surface on the tooth housing;

said one end of the handle having a transverse hole extending therethrough, said housing having a threaded opening (18) aligned with said transverse hole;

a screw connector (20) extendable through said transverse hole into the threaded opening to connect the handle to the tooth housing; said screw connector forming the sole attachment connection between the handle and tooth housing;

said handle being rotationally adjustable around the screw connector axis for adjustment between a first position extending crosswise of the tooth plane in a rake-like "T" configuration, and a second position extending generally within the tooth plane in a "comb" configuration;

said handle and housing having communicating cavities therein for containment of a liquid ointment adapted for outflow through said liquid discharge openings.

2. The comb structure of claim 1, and further comprising a resilient sealing washer (19) positioned on said attachment surface of the tooth housing to seal the joint between the handle and housing.

3. The comb structure of claim 1, and further comprising a transverse partition subdividing said handle into a battery chamber and a liquid-containment cavity; an electric heating element (119) extending through said partition into the associated cavity for melting grease that can form in the ointment at low-operating temperatures; and at least one battery in the battery chamber for energizing the heating element.

* * * * *